United States Patent [19]

Po

[11] Patent Number: 4,852,117
[45] Date of Patent: Jul. 25, 1989

[54] OPTICAL WAVEGUIDE AMPLIFIER AND LASER

[75] Inventor: Hong Po, Millis, Mass.

[73] Assignee: Polaroid Corporation, Cambridge, Mass.

[21] Appl. No.: 39,095

[22] Filed: Apr. 16, 1987

Related U.S. Application Data

[63] Continuation of Ser. No. 685,726, Dec. 24, 1986, abandoned, which is a continuation-in-part of Ser. No. 656,536, Oct. 1, 1984, abandoned.

[51] Int. Cl.$^4$ ............................................. H01S 3/082
[52] U.S. Cl. .......................................... 372/97; 372/6
[58] Field of Search ................ 372/6, 71, 72, 92, 93, 372/94, 97, 98

[56] References Cited

U.S. PATENT DOCUMENTS

| | | | |
|---|---|---|---|
| 3,826,992 | 7/1974 | Friedl | 372/6 |
| 4,136,929 | 1/1979 | Suzaki | 350/96.15 |
| 4,515,431 | 5/1985 | Shaw et al. | 372/6 |
| 4,546,476 | 10/1985 | Shaw et al. | 372/6 |
| 4,635,263 | 1/1987 | Mollenauer | 372/6 |
| 4,674,830 | 6/1987 | Shaw et al. | 372/6 |
| 4,676,583 | 6/1987 | Hicks | 372/6 |
| 4,720,160 | 1/1988 | Hicks | 372/6 |

FOREIGN PATENT DOCUMENTS

0225883 7/1986 Japan .................................. 372/71

Primary Examiner—William L. Sikes
Assistant Examiner—Robert E. Wise
Attorney, Agent, or Firm—Francis J. Caufield

[57] ABSTRACT

A resonant waveguide cavity, preferably a loop, is fabricated from an active material doped host glass and includes a wavelength dispersive lateral coupling designed to preferentially support wavelengths in a selected bandwidth. Pumping light is provided to excite the active material so that the supported wavelengths stimulate in phase emission to increase their amplitude with the amplified signal presented to an output fiber. Where a signal generator is desired, the pumping light can be used to drive the resonant cavity into oscillation to provide a CW output at one of the cavity supported wavelengths.

29 Claims, 6 Drawing Sheets

OPTICAL WAVEGUIDE AMPLIFIER AND LASER

CROSS REFERENCE TO RELATED APPLICATION

This is a continuation of application Ser. No. 685,726, filed Dec. 24, 1986, which, in turn, was a continuation-in-part of application Ser. No. 656,536, filed Oct. 1, 1984, both of which are now abandoned.

BACKGROUND OF THE INVENTION

This invention relates to light energy amplification and/or generation for select spectral bands used in optical waveguide communications systems. More particularly, it concerns a method and apparatus having utility both for generation signal carrier bandwidths of light energy introduced to an optical waveguide and for amplifying select bandwidths of such energy propagated in an optical waveguide.

Commonly assigned U.S. Pat. No. 4,342,499 issued Aug. 3, 1982 to John W. Hicks, Jr. discloses the use of tuned, dispersive lateral coupling of two single-mode fiber waveguides by which wavelengths as narrow as 1/1000 of the central wavelength may be selectively filtered. With central wavelengths of about 1 micron, therefore, line width of approximating 10 Angstroms can be filtered from one to the other of the fibers using the dispersive lateral coupling approach to wavelength filtering.

In a commonly assigned, co-pending application Ser. No. 625,543, now U.S, Pat, No. 4,720,160 filed June 28, 1984 by John W. Hicks, Jr., and incorporated herein by reference, a resonant cavity filter system is disclosed for use in optical fiber communication systems by which a line width in the range of 0.1 Angstrom to 0.01 Angstrom may be filtered from a base wavelength again in the 1 micron region of the electromagnetic spectrum. In this latter system, either linear or loop-form optical waveguides are used as resonant cavities tuned to a specific narrow spectral line and laterally coupled between a trunk line, in which light energy at the base wavelength is propagated, preferably as a single mode, and a branch line to which the filtered line width is passed as an information or signal carrying channel.

The major objective of narrow line-width filtering systems of these general types is to enlarge the number of information-bearing channels that can be carried by a single optical waveguide or trunk. The ability to filter line widths as narrow as 0.01 Angstrom, for example, makes available 1 million channels on a single transmission fiber without need for time domain multiplexing, at least on a mathematical or theoretical basis. Obviously, an operating optical waveguide system capable of carrying a number of channels several orders of magnitude lower than the theoretical number of available channels remains very attractive, given the present state of the communications art.

In pursuing the above-noted filtering system of optical fiber waveguides, limitations are encountered as a result of losses in light energy at successive taps of narrow line width channels from a common trunk. Thus, the resonant cavity approach to line width filtering, though offering great potential for directing an extremely narrow line width onto one of several branch lines of a single trunk communication system, is restricted by the light energy loss accumulating in successive taps from a trunk. In this regard, it should first be noted that each tap not only removes the desired wavelength, but also side orders thereof. Consequently, each successive tap reduces the transmission energy of not merely its own desired wavelength, but of a plurality of wavelengths. Reducing such losses by limiting the amount of energy extracted at each tap is, in turn, restricted by the requirement that a minimum amount of energy at the desired wavelength (e.g., more than 5% of the transmission energy) should be utimately delivered to the branch line for adequate propagation therein.

Another problem in pursuing the potential information carrying capacity of optical waveguides is that present optical waveguide fibers of fused silica with one or the other of the core and cladding doped with material to attain a lower index of refraction in the cladding than in the core, while demonstrating great potential for propagating single-mode light energy at very low losses, are limited to particular regions of the optical spectrum. For example, fused silica is particularly transparent to wavelengths slightly higher than 1 micron, specifically at approximately 1.34 microns. Laser sources capable of developing relatively noise-free signal carrier waves and of introducing wavelengths within this spectral range to an optical waveguide fiber are expensive at least at the present time. While relatively inexpensive laser diodes are available, a combination of low-cost, noise-free operation and operation in the optimum spectral range is expensive to attain given the present state of the laser diode art.

There is an acute need in the optical communications field, therefore, for an effective approach both to the development of noise-free signal carrier waves capable of efficient propagation in optical waveguides and to the amplification of light energy propagated in optical waveguides, particularly light energy at those wavelengths which are tapped or filtered from bandwidths propagated in an optical waveguide trunk, for example.

SUMMARY OF THE INVENTION

In accordance with the present invention, selected wavelengths of light energy propagated in an optical waveguide are amplified in a portion of a resonant cavity filter system. In one embodiment, the light energy is amplified by resonating the selected wavelengths in an active cavity defined by an optical waveguide containing neodymium, erbium or other active gain material and pumping the cavity to a sufficiently excited state that energy of the gain material is passed to the selected wavelengths. Means for suppressing selected emission bands of the active material, such as a dispersive couple, may be included within the cavity or at its output so as to provide unhindered gain at selected emission bands of the material.

The active resonant cavity is preferably an optical fiber having a core, a cladding with a lower index of refraction than that of the core, with portions intercoupled by a dispersive coupling to provide a continuous cavity for the wavelengths of interest. Because mode propagation of light energy in such optical fibers extends throughout the core and into the inner regions of the cladding, the gain material may be incorporated in the core, the cladding, or both. Thus, the gain material need be present only in those portions of the optical fiber in which mode propagation exists. The portion of the cavity containing the gain material is pumped, preferably by a laser diode at wavelengths in the range of 0.82 to 0.88 microns, through a fiber extension at one end of the cavity. Where the gain material is neodymium doped glass, for example, which will operate at wavelengths of both 1.06 microns and 1.34 microns, a dispersive lateral coupling is employed to confine the output of the assembly to a desired wavelength region of 1.34 microns in keeping with present optical waveguide transmissions.

In high density communications systems involving successive branch line taps along a main waveguide or trunk, a specific wavelength may be selected at each tap by utilizing one or more resonant filter stages with the input stage preferably being a passive cavity laterally coupled to the trunk to remove only a very small percentage of energy which is then amplified in a portion of a further filter stage such as a further cavity and, finally, propagated in the branch. To effect such amplification, at least one filter stage includes an active waveguide portion having gain material pumped to a level below the lasing threshold of the active material. For low density systems, a single filter/amplifier may be utilized.

Where a source or signal generator is desired, however, it is also contemplated that the structural organization of a resonant cavity with a pumping laser diode may alternatively be used above the lasing threshold of the gain material of the optical waveguide core to achieve stimulated emission at the resonant wavelength of the cavity and thus drive the resonant cavity into oscillation.

A principal object of the present invention, therefore is to provide light energy amplification at selected wavelengths using an inexpensive assembly of components. Another object is to provide an optical amplifier tap of high selectivity. A further object is to provide a laser source or signal generator using inexpensive components. Other objects and further scope of applicability of the present invention will become apparent from the detailed description to follow taken in conjunction with the accompanying drawings in which like parts are designated by like reference numerals.

DESCRIPTION OF THE PREFERRED EMBODIMENTS

Figure 1:
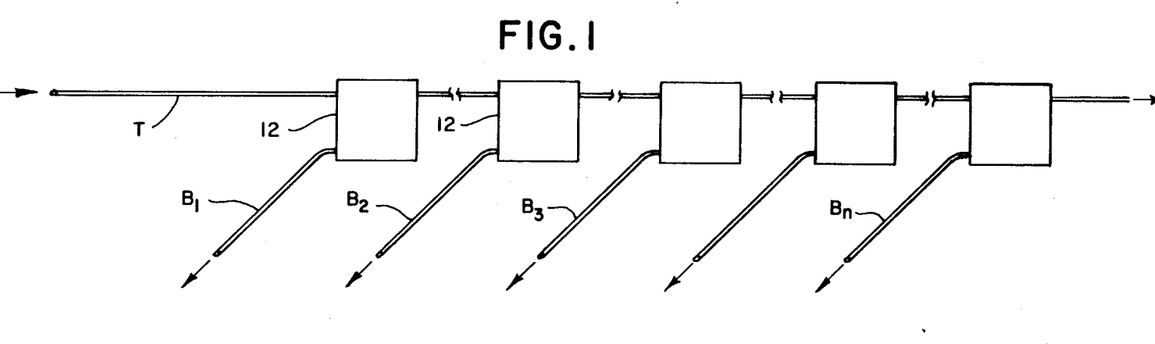
FIG. 1 is a schematic illustration of a portion of an optical fiber communication system showing a trunk line for carrying a large number of information-bearing wavelengths in a selected bandwidth and devices for filtering and amplifying selected ones of the information-bearing wavelengths from the wavelengths carried in the trunk.

In accordance with the present invention, an optical device that functions to filter and amplify an optical signal or wavelength can be utilized with an optical communications system of the type illustrated in FIG. 1 and designated generally therein by the reference character 10. As shown in FIG. 1, the communications system 10 includes a trunk line T that carries a plurality of information-bearing wavelengths distributed over a predetermined bandwidth and a plurality of branch lines $B_1$, $B_2$, $B_3$ ... $B_n$ that are coupled to the trunk line T by optical filter/amplifier devices 12 in accordance with the present invention as described more fully below. The communications system 10 of FIG. 1 is representative of open-loop systems well suited for telecommunications. Both high and low density systems can be accommodated, and as can be appreciated, the overall communications system 10 can also be closed upon itself to define a closed-loop system that is common in control system and data processing networks.

In the preferred operational environment, the trunk line T carries a plurality of information-bearing wavelengths spaced apart from one another across a selected bandwidth. For example, in a high density system where the communications, system utilizes light energy in the 1.34 micron region of the spectrum, the trunk line T can support 10,000 channels of 100 MHz each or, that is, 10,000 information-bearing wavelengths separated by 1.0 Angstrom intervals where a 1,000 Angstroms wide band centered about 1.34 microns is utilized. As can be appreciated by those skilled in the art, this exemplary bandwidth can be widened or the wavelength spacing decreased to increase the number of information-bearing wavelengths carried in the trunk line T by one or more orders of magnitude.

In transferring a selected wavelength from the trunk line T for a propagation along a branch line $B_n$, it is important that only the minimum light energy necessary be removed from the trunk line, since each branch line represents a successive cumulative reduction in the spectral energy in the trunk of both the selected wavelength as well as associated resonant orders as explained in detail below with regard to FIG. 2 wherein the direction of energy flow is designated by arrows.

Figure 2:
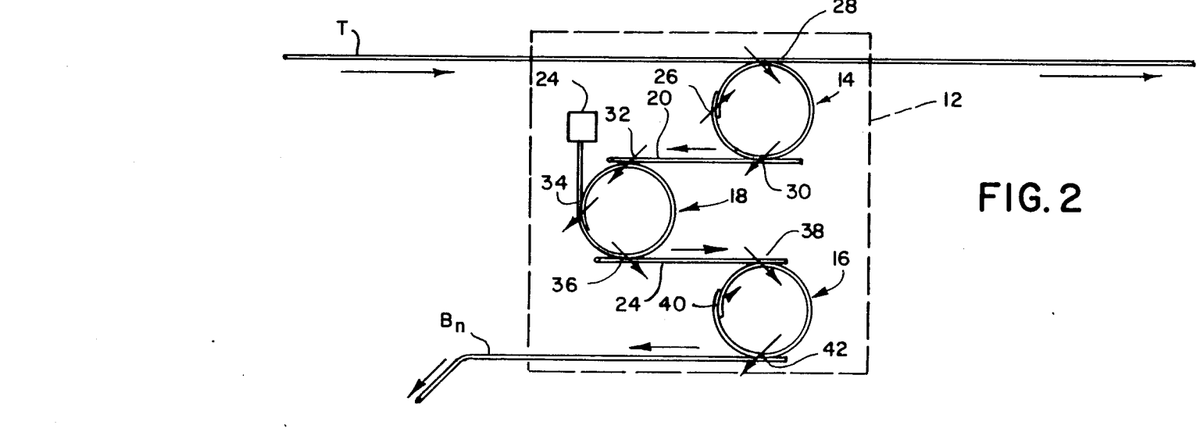
FIG. 2 is a schematic illustration of one of the filter/amplifiers illustrated in FIG. 1 for removing a selected wavelength from those carried in the trunk line by means of ring cavities.

For high density communication systems, in the preferred embodiment of the present invention, shown in FIG. 2, the filter/amplifier 12 includes a multistage arrangement for selectively removing a desired wavelength from the trunk line T, amplifying the removed wavelength, and presenting the amplified wavelength to a branch line $B_n$. Thus, the filter/amplifier 12 in this embodiment includes a passive, input resonant ring cavity or loop 14, an active, or gain providing, output resonant ring cavity or gain loop 16, and an active gain providing resonant ring cavity, or intermediate loop 18, positioned intermediate the input and output resonant loops. The loops are coupled to each other by respective input and output coupling lines or links 20 and 22, and a pair of pumping light sources 24 that provides pumping light into the gain loops 16 and 18. Preferably, the loops and their coupling lines are comprised of single mode fiber.

To accommodate high channel density, the filter/amplifier 12 of this embodiment broadly utilizes a three stage filtering technique as described and claimed in the aforementioned co-pending application Ser. No.625,543, now U.S. Pat. No. 4,720,160 wherein the filter stages (such as loops 14, 16 and 18 in the present embodiment) are of slightly different length to resonate wavelengths that are an integral number of half-wavelengths of the effective optical length of the cavity, but with only one wavelength co-resonant in all the stages. Hence, each cavity resonates a plurality of wavelengths or, that is, the wavelength of interest and its associated resonant orders as defined by the precise length of that cavity. One or more cavities are, however, of slightly different optical length than others so as to resonant the select wavelength of interest in common with the other cavities but different associated orders such that only the select wavelength is passed through the stages to the branch line. The cavities may be tuned or stabilized by mounting each on a thermally controlled or piezoelectric plate, etc. Additionally, a feedback system utilizing a stable reference can be employed.

In the present embodiment, the input resonant loop 14 is defined by a short closed loop of optical fiber laterally coupled onto itself through a coupling 26 and having physical characteristics, such as a selected length, that supports, or resonates, only particular wavelengths including the selected wavelength of interest for the particular branch line. Thus, the input resonant loop 14 preferentially supports a plurality of wavelengths (including the selected wavelength to be delivered to the particular branch $B_n$) that are an integral number of wavelengths of the effective optical length of the cavity. To minimize the extraction loss in the trunk line T, the input resonant loop 14 is coupled to the trunk through a weak lateral coupling 28 that extracts only a very small portion of the energy of the wavelengths propagating in the trunk line, for example, a coupling efficiency of 2% is adequate for such input coupling 28.

The input coupling link 20 is laterally coupled to both the input resonant loop 14 and the intermediate loop 18 through respective lateral couplings 30 and 32, while the output coupling link 22 is laterally coupled to both the loop 18 and the output loop 16 through respective lateral couplings 36 and 38. Finally, output loop 16 is coupled to the trunk line $B_n$ by lateral coupling 42. Lateral couplings can be fabricated utilizing rotationally nonsymmetric optical fibers as disclosed in U.S. Pat. No. 4,315,666 issued Feb. 16, 1982 to John W. Hicks, Jr., and entitled "Coupled Communications Fibers" the disclosure of which is incorporated herein by reference. Other arrangements can be utilized for lateral coupling, and it should also be noted that loops (such as the passive loop 14) which do not require a dispersive couple or end pumping as later explained with regard to the active loops may be closed by butt coupling.

The two gain providing loops 16 and 18 are defined by a length of optical fiber, each having one end coupled to the pumping light source 24, such as a laser diode, and the other end coupled onto itself through a below-described wavelength selective lateral coupling 34 to define a closed loop having resonant characteristics that will also support at least the wavelength of interest. The optical fiber F from which the gain loops 16 and 18 are fabricated is shown most clearly in FIG. 3A to include a core CO surrounded by a cladding CL having an index of refraction less than that of the core. The waveguide is a single mode guide whose core is dimensioned to support transmission signals in the 1.34 (or 1.06) micron region, and consequently, the lateral couples inherently tend to discriminate against transfer of the shorter wavelength of pump power which is, for example, in the 0.8 micron region in the case of neodymium.

Figures 2A, 2B, 3, 3A:
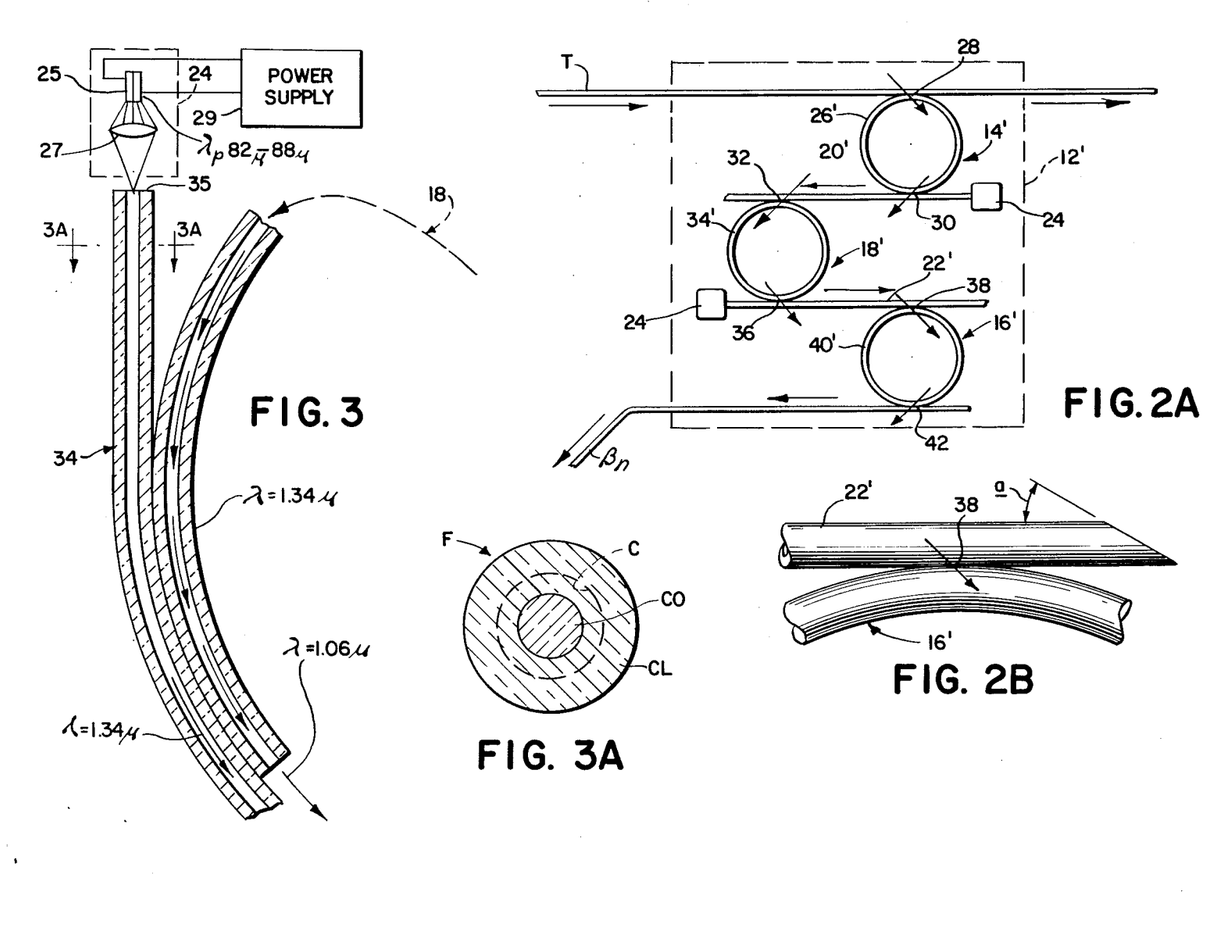
FIG. 2A is a schematic illustration of an alternative embodiment of the filter/amplifier illustrated in FIG. 2.
FIG. 2B is an enlarged fragmentary side elevation of a portion of the embodiment of FIG. 2A.
FIG. 3 is an enlarged fragmentary cross-section of a dispersive lateral coupling that closes a resonant loop in the preferred embodiment of the present invention.
FIG. 3A is an enlarged cross section on line 3A—3A of FIG. 3.

It is known in the art that while the major percentage of light energy propagated as one or more electromagnetic modes in the fiber F is confined to the core CO, as much as 30% of the energy is propagated in the inner region of the cladding CL represented in FIG. 3A by the annulus between the outer circumference of the core CO and the dashedline circle C. Because of the energy distribution of mode propagation in the fiber F, amplification of propagated light energy may be effected by gain media inclusion in the core CO, the cladding CL, or in both the cladding and the core, CL and CO. Most efficient use of the gain media and pumping energy, particularly in single mode fibers, occurs when the gain media is confined to the core and pumping energy is introduced axially or by end coupling into the end of the end of the core CO. On the other hand, providing the gain material in the cladding CL, or at least within the region of energy propagation in the cladding represented by the dashed-line circle C in FIG. 3A, enables efficient use of pumping light energy introduced to the gain media through a lateral coupling with the fiber F. An additional advantage of placing the gain material in the cladding is better dissipation of heat from operation of the excited gain material.

The active portion of the fiber F is fabricated from a host glass doped with an active, gain media or lasing media that absorbs light energy at one or more absorbing wavelengths and emits light at another, emitting wavelength or wavelengths. The preferred gain material is neodymium, although other rare earth materials including terbium and erbium are likewise suitable. The concentration of the dopant in the host glass can vary from a lower limit determined by the minimum gain required for a particular application and an upper limit determined by concentration quenching within the gain loops 16 and 18. In general, a concentration range between 0.1 and 30% (by weight) is suitable. The preferred host glasses include the alkaline earth silicates, although the germinate,.phosphate, and borate glasses are likewise suitable. The laser diode of the pumping source 24 is selected to have a light output at a wavelength within one of the absorption bands of the particular active material, viz., 0.78–0.88 microns where the active material is neodymium.

In an exemplary embodiment, as shown in FIG. 3, wherein the gain material is contained in the core, an economical laser diode 25 such as a gallium arsenide diode having 0.81 or 0.88 microns output is focused by a suitable lens 27 such as a microscope objective on one end 35 of each of the fiber forming loops 16 and 18. The diode is driven by an electric power supply 29 which is preferably adjustable or variable for reasons which will become apparent from the description to follow. The light source 24 is end coupled to the optical fiber that defines its loop so that the output of the light source 24 is passed into the core of the fiber in the direction of the signal flow around the loop. As the pumping light energy enters and circulates within each of the gain loops 16 and 18, the gain material absorbs photons with concomitant increases in the electron energy states. Depending upon the active gain material utilized, spontaneous emission can occur across a material specific emission spectra. Where neodymium is utilized as a gain media, spontaneous emission occurs in a bandwidth centered about 1.06 microns with emission also occurring in the 1.34 micron region of the spectrum. Since the bandwidth of the signals of interest propagated in the trunk line T lie presently in the 1.34 micron region of the spectrum, the characteristics of the gain loops 16 and 18 are preferably defined, as explained below with regard to FIG. 3, such that wavelengths in the spectral region of the latter are preferentially supported.

As shown in FIG. 3, the lateral coupling 34 that closes each of the gain loops 16 and 18 is of the dispersive type to functionally close the resonant loop only for wavelengths lying in the desired 1.34 micron region so as to thereby discriminate against the 1.06 micron emission. The wavelength selective dispersive lateral coupling 34 is tapered, for example, by fusing overlapping portions of the loop together and slightly pulling or drawing them to taper the overlapping fiber portions and, in turn, cause wavelength-dependent differences in dispersion between the bordering portions of the loops 16 and 18 so as to achieve wavelength selective coupling. A full disclosure of wavelength selective dispersive lateral couplings may be found in U.S. Pat. No. 4,342,499 issued Aug. 3, 1982 to John W. Hicks, Jr. and entitled "Communications Tuning Construction", the disclosure of which is incorporated herein by reference.

Accordingly, the gain loops 16 and 18, as defined by the selected length of optical fiber that constitutes the loop, and the wavelength selective lateral coupling 34 has characteristics that preferentially support wavelengths in the desired 1.34 micron emission band or region and discriminates against both signal and noise wavelengths longer and shorter than the transmission wavelengths, including the dominant 1.06 micron emission band where neodymium is utilized as the gain media. To provide amplification of the extracted wavelengths rather than oscillation as later noted in regard to FIG. 7, the maximum input power to the loop is controlled or maintained below the lasing threshold, so as to provide a gain less than the round trip losses in the loop.

It should be noted that while the preferred embodiment employs a dispersive couple 34 to dampen the 1.06 micron region (normally dominant in neodymium gain material) and thus amplify signals in the 1.34 micron region, which are presently preferred for their minimum dispersion in silica fibers, the 1.06 micron region could be utilized, for example, by simply making the loop couple non-dispersive, or by making it dispersive to dampen the 1.34 micron band. Similarly, the couple 34 which closes the gain loop may be designed to discriminate against both the 1.06 and 1.34 neodymium response regions if amplification of wavelengths in still other regions are preferred. Damping of the 1.06 band may also be achieved by doping the cavity core with chromium or tungsten or other material with preferential strong absorption within the band to be discouraged.

Continuing with the overall description of the filter-/amplifier 12, the output coupling link 22 is, as previously noted, laterally coupled to both the intermediate loop 18 and the output loop 16 through the lateral couplings 36 and 38. The output loop 16 is coupled onto itself through a lateral coupling 40 and to the branch fiber $B_n$ through lateral coupling 42. As in the case of the input resonant loop 14 and the resonant gain loop 18, the output loop 16 supports wavelengths that are an integral number of half-wavelengths of the effective optical length of the cavity. However, resonant characteristics of the output resonant loop are selected to preferentially support a different set of wavelengths than that of both the input resonant loop 14, and the intermediate loop 18, but with one common wavelength, namely, the desired wavelength for the particular branch line. This wavelength selection function, in which the intentionally different sets of resonant lines of the three loops have only one resonant line in common, is termed "coresonance". Thus, in this embodiment, all three loops 14, 16 and 18 are made of slightly different length, such that each supports a slightly different set of wavelengths with one wavelength (the wavelength of interest) common to, or that is coresonant in, all three loops. For example, assume the first loop 14 is constructed to have a finesse of 50, with the length of the loops 16 and 18 made plus and minus 2% in length, as compared to the loop 14, so as to have a finesse of 49 and 51, respectively, and the three stage tap will have a vernier tuning or selection capability of fifty cubed ($50^3$) or, that is, of one channel in 125,000. Thus, the length of the output loop 16 and the intermediate loop 18 are made of slightly different length with respect to each other and input loop 14 so that while their length is an integral number of wavelengths of the desired tap wavelength, it is not an integral number of wavelengths of the other wavelengths supported in the input loop. The loops may be constructed in different lengths or of the same length but tuned, e.g., by heating or stretching each, etc., as by separate heating chambers or piezioelectric plates.

As previously indicated, the input couple to loop 14, namely the coupling 28, is made a weak coupling, for example having a coupling efficiency of 2% to minimize the effect of the loop cavity 14 on the trunk T. On the other hand, the output couple 30 of this loop cavity is a stronger or tighter coupling having a coupling efficiency of 10%. Such differences in coupling efficiencies are provided by varying the coupling length or providing differences in the spacing of the laterally adjoining cores of each couple, etc. The average coupling efficiency is then 6% which, in turn, based upon the known equations for multiple coupling, results in a transfer efficiency in the order of 10%. Other coupling values which average 6%, such as 1% and 11%, respectively, for couplers 28 and 30, are also applicable.

Preferably, the second and third stages, loops 18 and 16, are critically coupled to their respective lines with a coupling approximating the average coupling efficiency of the first stage, namely 6%. Thus, the input and output of loop 18 (as well as loop 16) are matched (actually both having a 6% coupling efficiency) to provide critical coupling where all the energy input to the loop cavity (ignoring any gain) is diverted out of the loop at its output couple.

Consequently, in the preferred arrangement described above, 10% of the trunk energy (at selected wavelengths) is transferred by the first loop 14 to input coupling link 20. All this energy at the selected wavelength is, in turn, passed to the gain loop 18 which is preferably energized to provide a gain of ten. The amplified energy is, in turn, transferred to the output coupling link 38 and through it to loop 16 (also preferably energized to provide a gain of ten) which then tranfers all of the further amplified energy within the one coresonance wavelength to the branch $B_n$.

For a three stage system, if a finesse of 50 is selected (the resonant peaks are separated by 50 channels) for the first stage, and the transfer energy of the first stage is made 10%, this stage will extract 10% of the energy of 200 channels in the aforementioned 10,000 channel system. The extracted energy at least in the coresonant wavelength is passed to and amplified with a gain of ten by the intermediate loop 18, and, in turn, delivered to and amplified with a gain of ten by the output loop 16 from which it is transferred to the tap line $B_n$.

For a band width of 100 MHz with a finesse of 50, a loop length of 4 cm (loop radius 0.66 cm) is desired. To reduce losses at the desired operating wavelength band around 1.3 microns, a numerical aperture in the order of 0.2 is preferred. Since the latter is more easily achievable with a neodymium glass fiber, all stages are preferably made of the latter, even though the first is a passive stage. Thus, it is preferred that for a step profile fiber, the numerical aperture of each of the loops be made close to or greater than 0.2.

The cascaded, three stage resonator of FIG. 2 can also be constructed with two cavities, e.g., only loops 14 and 18, in which case for a finesse of 50, the tap will select one line of 2500 ($50^2$). Higher finesse (e.g., 100) may also be employed in the illustrated embodiments, and for a two stage resonator, the selection capability would then be 1 in 10,000 channels.

Alternately, and as shown in FIG. 2A, the amplification may be provided by portions of the filter stage which join one stage to another or, that is, within the links 20 and 22 of the embodiments described with reference to FIGS. 2 and 4. Thus in FIG. 2A, the links 20' and 22' are made of active material and pumped in the direction of transmission of the coupled wave (pumped from right to left) for coupling link 20' to amplify the wavelengths transferring from the input cavity loop 14'' to the intermediate cavity 18'. Similarly, the link 22' may be pumped by a laser diode 24 in the direction of transmission therein or from left to right as illustrated in FIG. 2A.

In the embodiment of FIG. 2A, to preclude reflection of the signal energy (as well as pump energy) within either of the connecting links 20' or 22', the ends of the connecting links are cleaved at an acute angle a of 10 degrees to 30 degrees (FIG. 2B) to the link axis so that energy transmitted along the full length of the link and reflected by the end is directed at a sharp angle to the axis and out of the link rather than back along its longitudinal axis.

The amplification in this arrangement is thus provided in the linking section or, that is, the segment of the amplifier stage joining two filter stages rather than, or in addition to, amplification in the cavity resonator of either stage.

Figure 4:
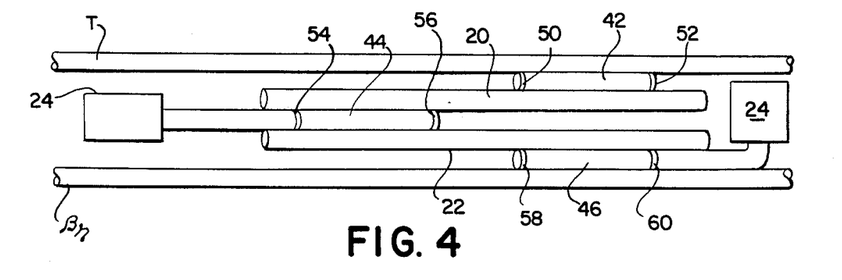
FIG. 4 illustrates a cavity filter/amplifier constructed in accordance with an alternate embodiment of the invention utilizing linear cavities.

Linear cavity resonators are also useful as shown in FIG. 4 wherein three linear cavities 42, 44 and 46 are shown with coupling links 20 and 22 joining them in a manner similar to that described with regard to FIG. 1. Rather than being looped back and coupled upon themselves, the linear cavities 42, 44 and 46 are fiber segments having reflective arrangements at opposite ends, such as mirrors 50, 52 for cavity 42, and mirrors 54, 56 and 58, 60 for the gain cavities 44 and 46, respectively. As in the embodiment of FIG. 2, each cavity is of slightly different length (or tuned to a different length) to provide coresonance only at the selected wavelength. To provide band suppression, the output coupling of each of the gain cavities is preferably a dispersive coupler (as described in regard to FIG. 3) configured to suppress transfer of unwanted wavelengths while passing selected wavelengths. For example, where neodymium fibers are employed for the active cavities 44 and 46 and the transmission band of the system is in the 1.34 band, the couple between cavity 44 and output link 22 as well as that between cavity 46 and the tap line $B_n$ are constructed to suppress the 1.06 band and pass the 1.34 band.

In a manner similar to the loop embodiment of FIG. 2, two stages, namely cavities 44 and 46 are pumped to provide gain. To transmit suitable energy to these cavities, the mirror at the pump end of each, namely mirrors 54 and 60, are made dichroic to transmit pump frequencies (in the order of 0.8 micron for neodymium while reflecting the frequencies in the transmission band of 1.34 microns.

Figure 5:
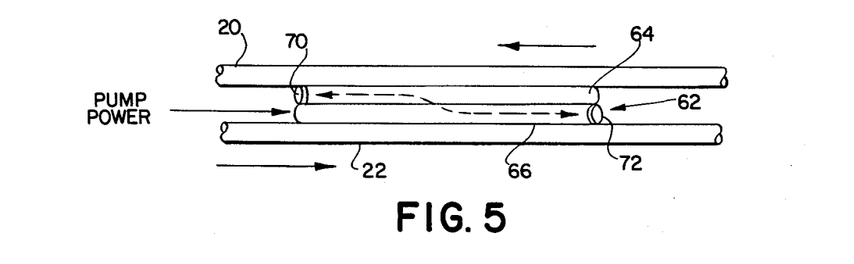
FIG. 5 illustrates an alternate embodiment of the linear gain cavities employed in FIG. 4.

As previously noted, the output of the gain cavities 44 and 46 may be dispersively coupled to their output fibers to dampen particular bands where desired. An alternative to such dispersive output couples is to employ a cavity 62 having an internal dispersive couple as shown in FIG. 5. In this structure, a pair of fiber segments 64 and 66 are dispersively coupled to one another in the manner previously described in regard to FIG. 3.

Thus, the input and output couples from the dispersive linear cavity 62 are similar to those described in regard to FIG. 2, but the cavity itself contains a dispersive couple designated at 68 where the two fiber segments 64 and 66 overly one another. Together the two fiber segments 64 and 66 define a tuned dispersive couple and a resonant cavity. The fiber element segment 64 has a reflective arrangement or mirror 70 at its left end while segment 66 carries a similar arrangement 72 at its right end. The coupling length between the reflector arrangements 70 and 72 is chosen to resonant the band of interest, while the couple dampens other selected wavelengths or bands such as the 1.06 micron band and where neodymium is utilized for amplification of the 1.3 micron band. A more detailed description of the linear dispersive cavity and its application is described in the aforementioned U.S. application Ser. No. 625,543.

To enhance the selectivity of the dispersive cavity 62, the nonreflective ends of the segments 64 and 66 may also be made lossy. For use as a gain cavity, pump power is delivered to one of the nonreflective ends as shown in FIG. 5.

It should also be noted that while loop cavities and linear cavities have been shown and described in separate alternate embodiments of the multi-stage filters, embodiments employing both types of cavities are also envisioned.

Figure 6:
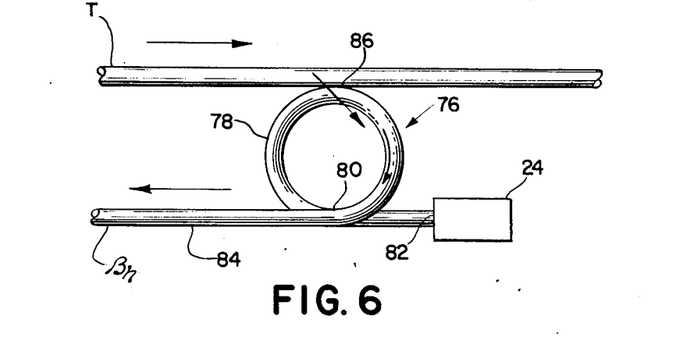
FIG. 6 illustrates a further embodiment of the invention utilizing a single filter/amplifier stage.

In addition to the use of the novel gain cavities in two and three stage arrangements wherein the first stage is passive, the inventive concept can be utilized in a single stage as shown in FIG. 6; preferably for use in trunk systems having low channel density of, for example, 50 channels.

The single stage arrangement of FIG. 6 includes a resonant loop 76 formed from a fiber 78, having a core of active material, which is coupled to itself as at 80 to provide input and output portions 82 and 84, respectively. For input to the loop 76, the latter is coupled to the trunk T by a weak coupling at point 86 in the manner described for the input couple 28 in regard to FIG. 2.

Pump power is input to the loop by source 24 in the direction of wave travel within the loop, and the coupling 80 which serves to close the loop is preferably made dispersive to dampen unwanted wavelengths, for example, the predominant band of the gain material and also the pump band since the loop and tap are a single fiber. It should also be realized that one of the linear dispersive cavities shown in FIGS. 4 and 5 may also be utilized in a single stage system for low channel density trunk.

As can be appreciated, the filter/amplifier can be fabricated to select one of many wavelengths available in the trunk line T to provide a device that can effectively implement wavelength multiplexing in a communications network where a large number of wavelength-distinct information-bearing signals are utilized.

Figure 7:
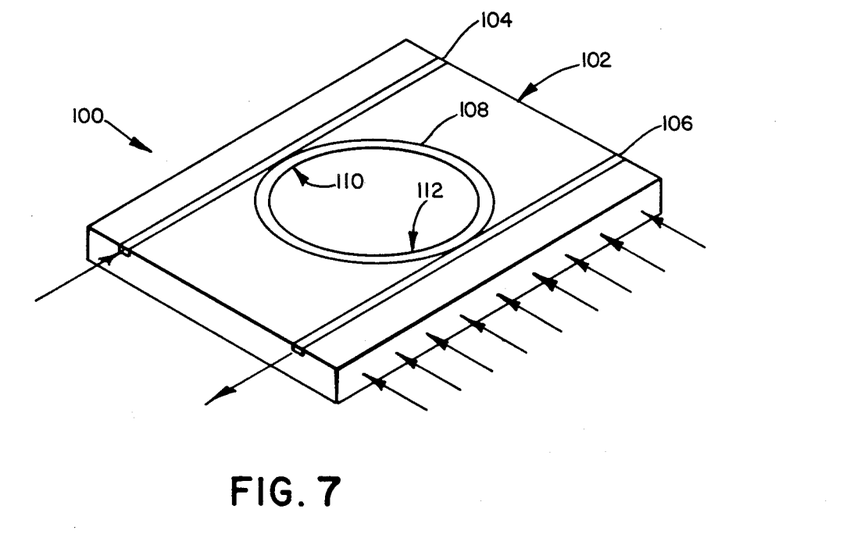
FIG. 7 illustrates an embodiment of a filter/amplifier, functionally similar to that shown in FIG. 2, in integrated optical form.
Figure 8:
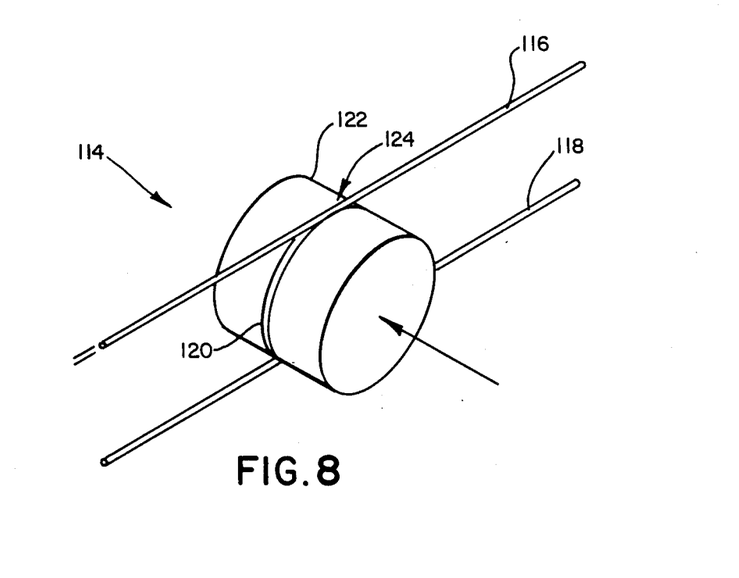
FIG. 8 illustrates another embodiment of a filter/amplifier in accordance with the present invention.

The filter/amplifiers schematically illustrated in FIGS. 1-6 constructed from drawn fiber also be fabricated with loops ar linear cavities in integrated optical forms including the embodiments of FIGS. 7 and 8 In FIG. 7, an integrated gain providing optical device 100 includes a substrate 102 formed from a gain material doped host glass. The substrate 102 is provided with a trunk or input channel 104 and a branch or output channel 106 with a closed loop resonant cavity 108 located between the two channels. The input channel 104 is coupled to the resonant cavity 108 through a weak lateral coupling 110, and the output channel 106 is coupled to the resonant cavity 108 through a strong coupling 112, for example, by controlling the spacing between the channels 104, 106 and the cavity 108 at the couplings. It should also be noted that to preferentially discriminate versus certain wavelengths or bands, the output coupling 112 is made dispersive by tapering the channel 106 and the loop 108 at this coupling point.

The input and output channels 104 and 106 and the resonant cavity 108 are formed in the substrate 102 by conventional processing techniques by which the indices of refraction of the channels are varied with respect to the substrate to support guided light transmission at or beneath the surface. Pumping light is laterally directed into the substrate 102 from a suitable source, not shown, that includes light energy within the absorption spectra of the gain material. The lateral coupling 110 couples a selected portion of the energy of the wavelengths (e.g., 1-2%) in the input channel 104 into the resonant cavity 108. The resonant cavity 108 is formed so as to have resonant characteristics within the bandwidth carried in the input channel 104. The substrate 102 is pumped to excite the active material with the wavelengths removed from the input channel 52 stimulating in phase emission that increases the wavelength gain. The gain increased wavelengths are then coupled to the output channel 106 through the lateral coupling 112 for propagation to a wavelength utilizing device, for example, another resonant device that effects coresonant wavelength selection as described above.

The amplifier arrangement of FIG. 7 may be constructed by a variety of known planar optics techniques such as by use of substitutional ions, ion exchange or implantation, etc. The substrate 102 may be initially formed of active (gain) material with passive ions employed to raise the index of the channels and loop. Additionally, the substrate 102 can be of passive material with the loop 108 formed by active and also index raising implants while the channels are formed solely by passive index raising implants, etc. Both the channels and the loop can be provided at or buried below the surface by appropriate known techniques.

In FIG. 8, an optical gain providing device 114 includes a trunk or input fiber 116, an output fiber 118, and a resonant loop channel 120 formed about the circumference of a cylindrical substrate 122. The loop channel 120 or the substrate 122 is formed from a gain material doped host glass in the manner previously described. The input fiber 116 is coupled laterally to the resonant loop through a weak coupling 124 while the output fiber 118 is coupled in a similar manner, but much more tightly coupled on the side (not shown) opposite from the lateral coupling 124. The lateral coupling 124 is effective to remove a portion (e.g., 1-2%) of the energy from the wavelengths in the input fiber 116 and couple the wavelength into the resonant loop 120. The cylindrical substrate 122 is end pumped from a pumping source (not shown) which excites the active gain material in loop 120. The wavelength in the resonant loop 120 stimulates in phase emission to effect a gain increase with the amplified wavelength coupled to the output fiber 118 for propagation to the next stage or other signal utilizing device (not shown).

It is to be noted that in each of the previously described embodiments, the pumping light source 24 is driven by the power supply 29 to energy levels adequate to produce gain in the active or pumped resonant cavity to provide amplified light energy propagated in the branch line $B_n$. In all cases, however, the energy gain produced is less than the combined losses of the active or pumped cavity including, for example, transmission losses in the fiber cavity, losses due to the radius of curvature of the loop-form cavities, losses at the mirrors of linear cavities, coupling losses, and the like. In other words, the lasing threshold of the active cavity, or the point at which the gain begins to exceed cavity losses, is never reached. Hence, where the apparatus of the invention is used for amplification of light energy previously introduced into or propagated in a waveguide, the power supply 29 is adjusted or varied as necessary to keep the level of pumping light energy below the lasing threshold of the pumped cavity.

On the other hand, where the laser diode selected for the pumping function is of an appropriate design in relation to the loss characteristics of the active cavity to be pumped, the current provided by the power supply 29 may be adjusted to increase the pumping light energy to produce a gain from spontaneous emission in the pumped cavity which exceeds the losses of the cavity. In this condition of operation where the lasing threshold is exceeded, oscillation of stimulated emission in the resonant bandwidth of the active cavity will occur. Accordingly, the amplifying loop arrangement of FIG. 2 as well as the linear embodiments of FIGS. 4 and 5 can be adapted as a wavelength selective laser or signal generator.

Figure 9:
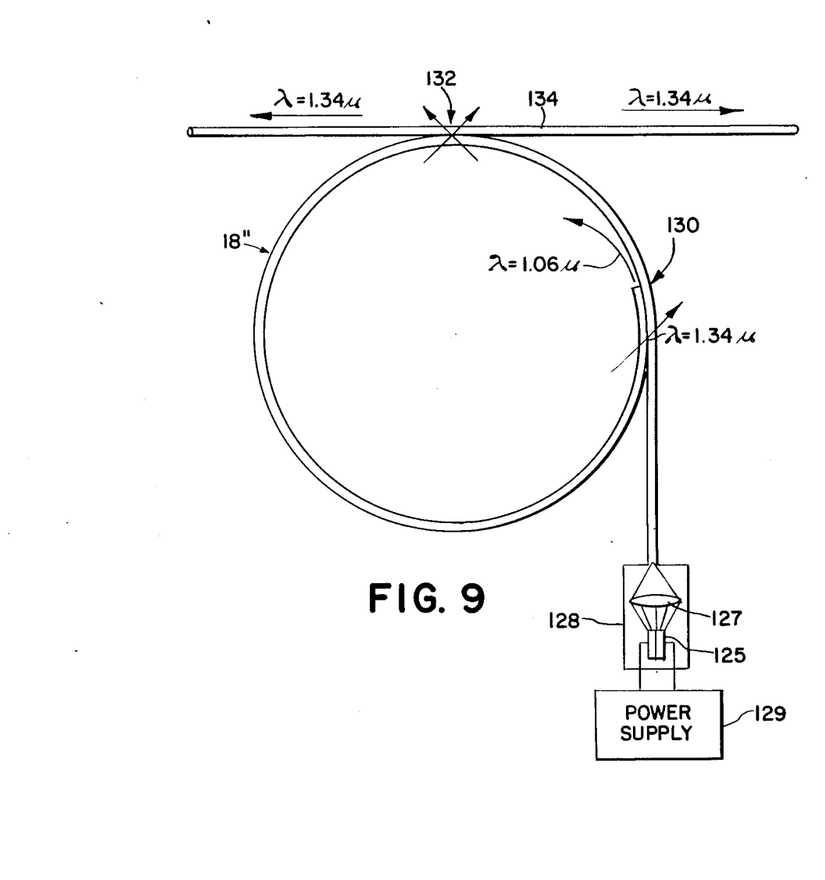
FIG. 9 is a schematic illustration of a signal generator in accordance with the present invention.

In FIG. 9 of the drawings, therefore, an economical laser diode 125, such as a gallium arsenide diode, operating at 0.82 or 0.86 microns, is again incorporated with a focusing lens 127 in a pumping unit 128 having a power supply 129. The output of the laser diode 125 is focused by the lens 127 on one of a gain 18", formed from an optical fiber doped with an active media as described above and dispersively laterally coupled onto itself through a coupling 130 and further coupled through a lateral coupling 132 to an output fiber 134. The physical characteristics of the gain loop 18" as well as that of the wavelength-selective dispersive lateral couple 130 are selected so that the gain loop is resonatable for a selected wavelength, typically 1.34 microns in the case of optical communication systems, The pumping light source 125 provides light energy within the absorption spectra of the active material, for example, 0.78 to 0.88 microns in the case of neodymium, with the radiant intensity of the pumping light in this embodiment being sufficient to maintain the material at a level above the lasing threshold. Thus, the input intensity is sufficient to provide gain exceeding the round trip losses and the gain loop 18" is driven into oscillation at the resonant wavelength permitted by the dispersive lateral couple 130, 1.34 microns in this case, with a portion of the wave energy oscillating within the gain loop 18" laterally coupled onto the output fiber 134. All other wavelength emissions, including 1.06 micron emissions, where neodymium is utilized as the gain media, do not couple through the dispersive lateral couple 132 and thus are not amplified or oscillated in the gain loop 18".

The above-described arrangement illustrated in FIG. 9 thus provides a simple, efficient CW laser of relatively high power useful as a signal generator for fiber optic transmission in the presently preferred 1.34 micron region. It can, of course, also be made to operate predominantly in the 1.06 micron region with neodymium gain material by utilizing a non-dispersive couple to close the loop 18" since the 1.06 micron region is the dominant emission spectra of this material. Other materials can also be utilized in this regard, and it should be understood that this structure provides an arrangement for economically producing a relatively high laser output in a desired spectral region by means of a resonant optical cavity of selected gain material pumped by a low power economical laser having a frequency outside of the desired spectral region, but within the absorption region of the cavity gain material.

Figure 10:
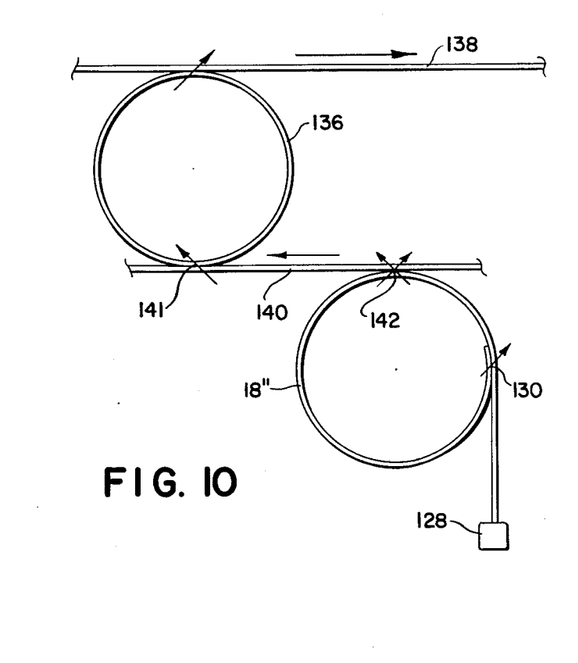
FIG. 10 is a schematic illustration of a signal generator in accordance with the invention.

The coresonance of a two stage cavity system may also be utilized to provide a laser producing a single line in the emission band of the active material. Thus, in FIG. 10 the laser illustrated in FIG. 9 is modified the include an additional butt coupled, closed loop cavity 136 coupled between the pumped loop 18" and an output fiber 138 by a fiber link 140, shived at its ends, and connected to the first and second loops 18" and 136 by lateral couples 141 and 142, respectively. As in the multiple filter arrangements, the additional cavity is of slightly different length to select one line of the emissive region of the first loop by means of coresonance. Further, the second or both cavities 18" and 136 may be altered by heating or stretching to vary the select output wavelength of the laser.

Figure 11:
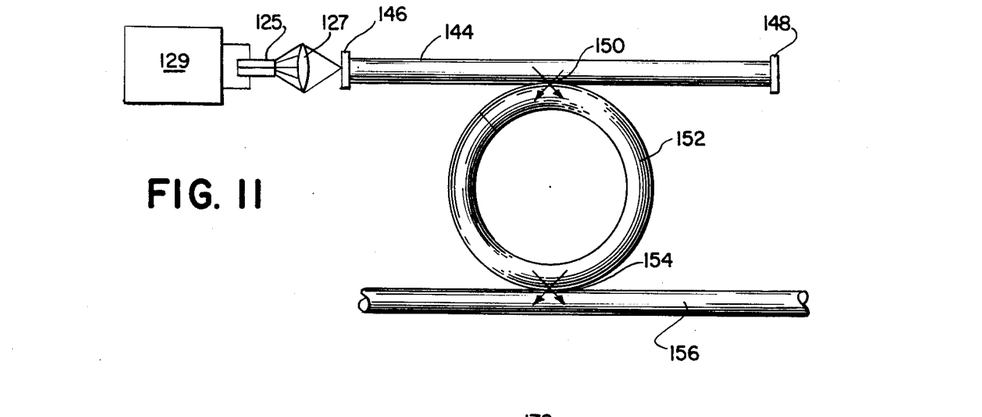
FIG. 11 is a schematic illustration of an alternative signal generator embodiment.

Both loop and linear cavities can be utilized for the above-described laser operation. For example, and as shown in FIG. 11 a linear cavity defined by an optical fiber segment 144 pumped at one end through a wavelength discriminating dichroic mirror 146 which passes pump energy in the absorption band, but reflects energy in the emissive band. A mirror 148 at the opposite end of the first cavity defining segment 144 is similarly reflective. The linear cavity is coupled through a lateral couple 150 to a second cavity, for example, a butt or laterally coupled loop cavity 152, having a coresonant line which consequently defines the narrow output line of the laser unit. The second cavity 152 is, in turn, coupled via a lateral coupling 154 to an output waveguide 156. Either the lateral couple 150 to second cavity or the lateral couple 154 to the output 156 may be a dispersive coupling to dampen output in one or more of the emission bands as previously explained.

Figure 12:
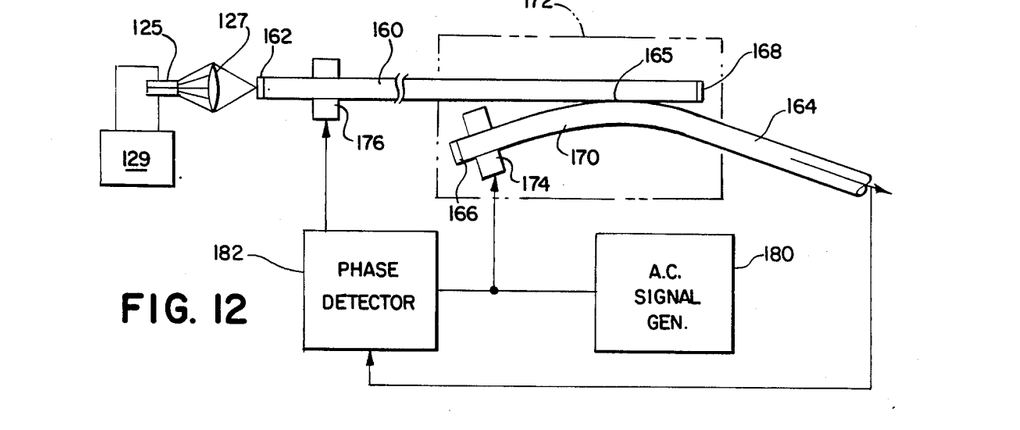
FIG. 12 is a schematic illustration of a further signal generator embodiment.
Figure 13:
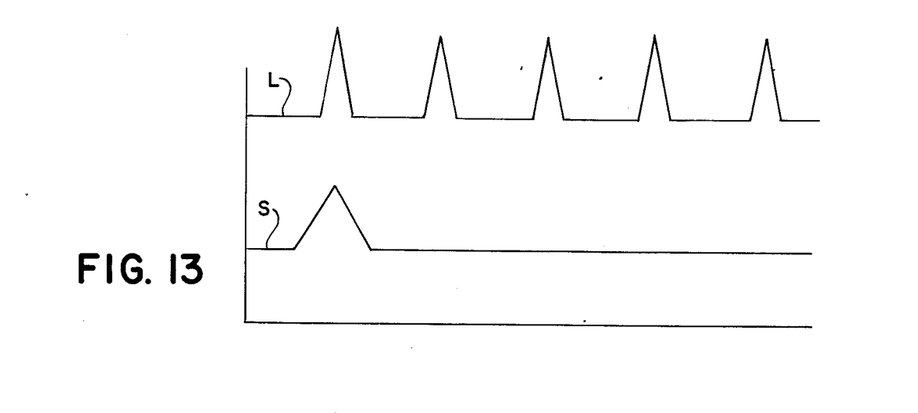
FIG. 13 is a chart of curves representing a comparison of resonant cavity waveforms applicable to the embodiment of FIG. 12.

Another embodiment of a coresonant or dual cavity optical laser is illustrated in FIG. 12 of the drawings. As shown in FIG. 12, a first linear fiber cavity 160, having an active core as described previously, is pumped through a dichroic mirror 162 at its absorption frequency to provide stimulated emission within the emission bands of the active material. A second fiber 164 is connected via a lateral couple 165 near one end of the first cavity 160 and carries a mirrored end 166 which, in conjunction with a second mirrored end 168 of the first cavity 160, provides a second cavity 170 extending across the couple 165. The first cavity is made coresonant with the second cavity, but is long relative to the second cavity to provide, for example, a length ration of 10:1 in which the first cavity 160 is 10 cm whereas the second cavity 170 has an effective length of 1 cm. As a result, the second cavity provides a large free spectral range compared to the first cavity. This relationship of spectral characteristics is represented in FIG. 13 wherein the number and spacing of wavelengths resonant in the first cavity 160 are depicted by the curve L. By comparison, only one wavelength (including side orders) is resonant in the short second cavity 170 as illustrated by the curve S.

The short cavity 170 is temperature controlled by its location within a temperature variable chamber 172 and mechanically controlled by a piezoelectric device such as a member 174 affixed to a portion of the second fiber 14 which makes up the short cavity. Another piezoelectric device such as a member 176 is affixed to a portion of the first cavity 160 outside of the segment thereof which cooperates in forming the second cavity 170.

The laser system uses coresonance to select single line output from the emissive band of the active material. To provide coresonant operation, the couple 165 provides 50% to 80% transfer since with over 80%, the first cavity will output through the fiber 170 with little effect from the short cavity.

For tuning and gross stabilization, the temperature of the chamber 172 is varied. For fine tuning, the piezoelectric members 174 and 176 are employed to change the path length of the cavities. The fine tuning operation is effected by dithering the piezo member 174 from an A.C. signal generator 180 to slightly and rapidly vary the optical path length of the short cavity 170 such that the resonant lines of the short cavity 170 are correspondingly dithered. The dither signal and a sample of the laser output are also fed to a phase detector 182. If the coresonant line of the first, long cavity 160 is well centered within that of the short cavity, the phase detector will sense no difference in the laser output. However, if the long cavity resonance is not well centered in the other, a slight variation will be seen in the laser output, and the phase detector signals the piezo member 176 to change or, that is, expand or contract in a proper direction to vary the optical path length of the long cavity 160 and thus return the select line to the center of the resonant line in the short cavity 170. For example, the phase signal is amplified in the detector and applied to member 176 to tune the long cavity in accordance with the phase difference.

Thus, it should be understood that: the cavities 160 and 107 provide a pair of coresonant cavities of different resonant lengths; the active core of cavity 160 in conjunction with the pump 125 provide means for providing lasing light energy within the cavities; and the members 174 and 176 in conjunction with the A.C. signal generator 180 and phase detector 182 provide means for determining the difference between the alternating tuning of one cavity and the light energy output, and for tuning the other cavity in accordance with the phase difference to provide a narrow band, highly stabilized laser output.

Consequently, the invention allows the effective removal of a portion of the energy from a trunk line carrying a number of wavelengths. The removed wavelengths are amplified in a resonant cavity with one of the wavelengths coupled to an output for presentation to a signal utilizing device. If desired, the gain cavity structure of the present invention also signal by driving the resonant cavity into oscillation to provide a lasing output.

Thus, it will be appreciated from the above that as a result of the present invention, a highly effective filter/amplifier and signal generator are provided by which the principal objectives, among others, are completely fulfilled. It will be equally apparent, and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

I claim:

1. An optical waveguide device for tapping a trunk line carrying a set of optical signals to amplify one or more select signals form the set and transfer the amplified signals to another line for further travel therealong, said waveguide device comprising:
   (a) a first optical waveguide cavity for coupling to the trunk line and extracting from it at least a portion of the energy of a group of optical signals at wavelengths that encompass said select signals, said first optical waveguide cavity being resonant for said group of signals,
   (b) a resonant gain optical waveguide cavity coupled to said first resonant optical waveguide cavity to receive said portion of said group of signals resonant therein, said resonant gain optical waveguide being coresonant with said first resonant optical waveguide cavity at wavelengths corresponding to those of said select signals and comprising an active gain material with given absorption and fluorescence spectrums wherein said fluorescence spectrum has an emission band that encompasses said select optical signals and wherein said resonant gain optical waveguide cavity further includes means for precluding amplification of optical signals at wavelengths other than those corresponding to said select optical signals; and
   (c) means for introducing pumping energy within said absorption band into said resonant gain optical waveguide cavity in an amount below the lasing threshold thereof to amplify only said select signals.

2. The optical waveguide device of claim 1 wherein said optical waveguide cavities are in the form of closed loops.

3. The optical waveguide device of claim 1 including at least one other resonant cavity evanescently coupled to said resonant gain optical waveguide cavity to transfer said select optical signals to the other line for travel therealong.

4. The optical waveguide device of claim 3 wherein said one other resonant waveguide cavity is a gain cavity coresonant with said resonant gain waveguide cavity with a dispersive lateral coupler.

5. The optical waveguide device of claim 1 wherein said optical waveguide cavities are in the form of linear resonant cavities.

6. A laser comprising:
   a gain cavity including a single mode optical waveguide having a core and a cladding, said core including an active gain material with given absorption and fluorescence spectrums wherein said fluorescence spectrum has an emission band that encompasses a predetermined spectral region, said waveguide being laterally coupled to itself at a given point to form a loop with one end thereof extending therefrom, said point of coupling defining an optical resonant cavity length within a given resonant band encompassed by said broad spectral region;
   pumping means for introducing pump light into said core within said given absorption spectrum at said extended end of said waveguide in an amount sufficient to cause lasing action within at least said given resonant band; and
   means for extracting light energy within said given resonant band from said loop.

7. The laser of claim 6 further including means for suppressing emission at wavelengths other than those within said resonant band.

8. The laser of claim 7 wherein said suppressing means comprises a dispersive lateral coupler which joins the ends of said loop.

9. The laser of claim 6 wherein said active gain material comprises neodymium ions.

10. A laser comprising:
    a pair of optical waveguide cavities where one of said waveguide cavities is a gain cavity in the form of a single mode waveguide having a core and a cladding where at least one of said core and cladding includes an active gain material with given absorption and fluorescence spectrums wherein said fluorescence spectrum as an emission band that encompasses a predetermined spectral region, said waveguide cavities being coupled with one another and structured to be coresonant at a select wavelength within said broad spectral region but otherwise not;
    means for introducing pump light into said gain cavity within said absorption spectrum to simulate lasing action to provide oscillation within said gain cavity at said select wavelength; and
    means for extracting light energy at only said select wavelength so that the output of said laser is at only said select wavelength.

11. The laser of claim 10 wherein said one of said cavities is short compared to the other to provide a large free spectral range compared with that of the longer cavity's.

12. An integrated optics waveguide device for amplifying light energy responsive to optical pumping, said device comprising:
   a substrate transmissive at the wavelength of the pump light;
   a resonant optical waveguide cavity formed in said substrate with a core of higher index than the material surrounding it, said core including an active gain material with given absorption and fluorescence spectrums wherein said fluorescence spectrum has an predetermined spectral region, said waveguide cavity being structured to be resonant at at least one wavelength encompassed by a given emission band within said broad spectral region;
   input coupling means for introducing said one select wavelength to said cavity; and
   output coupling means for extracting amplified light energy of said one wavelength from said cavity.

13. The device of claim 12 wherein said substrate includes a planar surface and said cavity is formed as a closed loop therein.

14. The device of claim 12 wherein said substrate is in the form of a cylinder.

15. An optical waveguide device for tapping from a waveguide trunk line carrying a set of optical signals only a portion of one or more select signals and then amplifying those select signals so that the remainder of them are available for subsequent downline use, said waveguide device comprising:
   at least one waveguide resonator that is resonant at wavelengths corresponding to those of the select signals, said wavelength resonator having a portion for evanescently coupling to a complementary portion of the waveguide trunk line for transferring from the waveguide trunk line to said waveguide resonator at least a portion of the energy of a group of optical signals that encompass said select signals, said waveguide resonator further including active gain material along the optical path traveled by said select signals, said gain material having given absorption and fluorescence spectrum where said fluorescence spectrum has an emission band that encompasses said select optical signals to be amplified, said waveguide resonator further including wavelength selective means for precluding amplification of signals other than said select signals and another portion for evanescently coupling with a complementary portion of a branch line for transferring amplified signals to the branch line for further travel therealong; and
   means for introducing pumping energy within said absorption band of said gain material into said waveguide resonator in an amount below the lasing threshold for said waveguide resonator to provide only enough gain thereon to amplify only said select signals when present in said waveguide resonator.

16. The optical wavelength device of claim 15 wherein said waveguide resonator comprises a plurality of resonant waveguide cavities coupled to one another with dispersive lateral couplings.

17. The optical waveguide device of claim 16 wherein said resonant cavities are in the form of closed loops.

18. The optical waveguide device of claim 17 wherein said closed resonant loops comprise a first passive loop coupled directly to the trunk line to transfer a portion of signals within a select bandwidth therefrom and a second active loop coupled with said first passive loop.

19. The optical waveguide device of claim 18 wherein said first passive loop and said second active loop are coupled with dispersive lateral coupler.

20. Te optical waveguide device of claim 19 wherein said first passive and said second active loops are coresonant with one another.

21. The optical waveguide device of claim 16 wherein said plurality of resonant waveguide cavities comprise linear resonant cavities.

22. the optical waveguide device of claim 15 wherein said wavelength selective means comprises means for suppressing emission of said gain material at wavelengths other than those corresponding to said select signals.

23. The optical waveguide device of claim 15 wherein said wavelength selective means comprises a dispersive filter to render said waveguide resonator resonant at only wavelengths corresponding to said select signals and lossy at other wavelengths.

24. The optical waveguide device of claim 15 wherein said waveguide resonator comprises a resonant waveguide in the form of a closed loop.

25. The optical wave guide device of claim 24 wherein said waveguide resonator comprises a linear optical cavity in the form of a single mode optical fiber having dichroic mirrors formed at each end to provide wavelength selective feedback for resonance at wavelengths corresponding only to said select signals.

26. The optical waveguide device of claim 24 wherein said resonant closed loop is a curved waveguide whose ends overlap as a lateral dispersive coupler.

27. The optical waveguide device of claim 15 wherein said waveguide resonator comprises a single mode waveguide having a core with a given index of refraction and a surrounding cladding with an index higher than that of said core, at least one of said core or said cladding having incorporated therein said active gain material.

28. The optical waveguide device of claim 15 wherein active gain material comprises neodymium ions in the form of neodymium oxide.

29. The optical waveguide device of claim 15 formed in integrated fiber optic format.

* * * * *